US010432663B2

(12) United States Patent
Kurian (10) Patent No.: US 10,432,663 B2
(45) Date of Patent: *Oct. 1, 2019

(54) ELECTRONIC SECURITY KEYS FOR DATA SECURITY BASED ON QUANTUM PARTICLE STATES THAT INDICATES TYPE OF ACCESS

(71) Applicant: Bank of America Corporation, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 157 days.

This patent is subject to a terminal disclaimer.

(21) Appl. No.: 15/496,442

(22) Filed: Apr. 25, 2017

(65) Prior Publication Data

US 2018/0309785 A1  Oct. 25, 2018

(51) Int. Cl.
| | |
|---|---|
| *H04L 9/08* | (2006.01) |
| *H04L 29/06* | (2006.01) |
| *G06N 10/00* | (2019.01) |
| *G06F 16/22* | (2019.01) |
| *G06N 3/02* | (2006.01) |

(52) U.S. Cl.
CPC .......... *H04L 63/1466* (2013.01); *G06F 16/22* (2019.01); *G06N 10/00* (2019.01); *H04L 9/0858* (2013.01); *H04L 63/1425* (2013.01); *H04L 63/1475* (2013.01); *G06N 3/02* (2013.01); *H04L 63/0428* (2013.01)

(58) Field of Classification Search
CPC ............ H04L 63/1466; H04L 63/1425; H04L 63/0428; H04L 9/0852; H04L 9/16; G06F 17/30312; G06N 3/04; G06N 99/002

See application file for complete search history.

(56) References Cited

U.S. PATENT DOCUMENTS

| | | |
|---|---|---|
| 6,522,749 B2 | 2/2003 | Wang |
| 6,609,139 B1 | 8/2003 | Dultz et al. |
| 7,178,277 B2 | 2/2007 | Takeuchi |
| 7,577,257 B2 | 8/2009 | Xia et al. |
| 7,590,868 B2 | 9/2009 | Musa et al. |
| 7,929,700 B2 | 4/2011 | Lodewyck et al. |
| 8,340,298 B2 | 12/2012 | Gelfond et al. |
| 8,483,394 B2 | 7/2013 | Nordholt et al. |
| 8,582,769 B2 | 11/2013 | Zhao et al. |

(Continued)

*Primary Examiner* — Khoi V Le (74) *Attorney, Agent, or Firm* — Michael A. Springs; Moore & Van Allen PLLC; James C. Edwards (57) ABSTRACT

Systems and method for determining for determining the type of unauthorized access that occurs when a quantum-level encrypted message is tampered with or otherwise accessed during message communication/transmission. The quantum-level encrypted message is configured to change quantum particle states in response to at least an attempt to access the message. The messages may be logically programmed such that the message records, in an encrypted block, the type of access or the type of access may correspond to a quantum particle state. In other embodiments, a neural network storing empirical data associated with previous quantum-level encrypted messages that have been accessed is analyzed to determine the type of unauthorized access and, in some embodiments, the entity, nodes or infrastructure associated with the unauthorized access.

20 Claims, 7 Drawing Sheets

(56) References Cited

U.S. PATENT DOCUMENTS

| | | |
|---|---|---|
| 8,639,932 B2 | 1/2014 | Wiseman et al. |
| 8,650,401 B2 | 2/2014 | Wiseman et al. |
| 8,693,691 B2 | 4/2014 | Jacobs |
| 8,744,075 B2 | 6/2014 | Tanaka |
| 8,897,449 B1 * | 11/2014 | Broadbent ............ H04L 9/0891 380/277 |
| 8,903,094 B2 | 12/2014 | Bovino |
| 2002/0199108 A1 | 12/2002 | Chuang et al. |
| 2004/0078421 A1 | 4/2004 | Routt |
| 2006/0056630 A1 | 3/2006 | Zimmer et al. |
| 2007/0177735 A1 | 8/2007 | Mimih et al. |
| 2008/0152147 A1 | 6/2008 | Xia et al. |
| 2009/0175450 A1 | 7/2009 | Brandt |
| 2009/0194702 A1 | 8/2009 | Meyers et al. |
| 2017/0126654 A1 * | 5/2017 | Fu ......................... H04L 9/0852 |
| 2018/0309572 A1 * | 10/2018 | Kurian .................. H04L 9/0852 |

* cited by examiner

ELECTRONIC SECURITY KEYS FOR DATA SECURITY BASED ON QUANTUM PARTICLE STATES THAT INDICATES TYPE OF ACCESS

FIELD OF THE INVENTION

The present invention related to data security and, more specifically, determining the type of unauthorized access that occurred during communication of a quantum-level encrypted message.

BACKGROUND

Quantum computing involves theoretical computation systems that make direct use of quantum-mechanical phenomena, such as superposition and entanglement, to perform operations on data. Whereas common digital computing requires that the data be encoded into binary digits (i.e., bits), each of which is always in one of two definite states (0 or 1), quantum computation uses quantum bits, which can be in superpositions of states.

While quantum computing is a burgeoning technology, its use is foreseen to grow in the near future as a means of solving complex problems more efficiently. However, technical challenges exist in building large-scale quantum computers and, as such, quantum-capabilities are limited. Thus, in the event that an entity, such as an enterprise, corporation, university or the like has a need or will have a need in the future to implement quantum-level computing, the entity is likely to rely on third-party entities (i.e., entities external from the enterprise, corporation, university or the like) to conduct such processing of data.

However, in today's computing environment in which data is entrusted in other entities, data breaches occur at an alarming rate. A data breach is a security incident in which data, typically sensitive, protected confidential data is copied, viewed, misappropriated or otherwise used by individuals/entities other than those authorized to do so. The breaching of data may be part of multiple entities acting together (e.g., collusion or conspiracy) or implicate governments or the like (e.g., espionage). Such data breaches may be intentional (i.e., perpetuated by wrongdoers) or unintentional, but in either instance, once the data has been comprised, the harm to the data owner is unavoidable. In this regard, when an entity provides data to a third-party/external entity, the entity runs the risk that the data may be breached.

Further, breaches may occur when data is communicated/transmitted from one entity to another designated/intended entity. Specifically, a message containing data, even though encrypted or otherwise secured, may be tampered with or otherwise accessed during the communication/transmission of the message. In many instances the parties to the communication (i.e., the message sender and the intended recipient) may be unaware that the message has accessed or otherwise tampered with and, even if they are aware that the message has been tampered with or accessed, the parties to the communication may be unaware of what type of access has occurred. Types of access may include, but are not limited to, intercepting/observing the message, reading the message, writing from the message, logging the message, storing the message and the like.

Therefore, a need exists to determine the type of unauthorized access (e.g., observing, reading, writing, logging, storing and the like) that occurs when a message, specifically a quantum-level encrypted message, is tampered with or accessed during communication.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for determining the type of unauthorized access that occurs when a quantum-level encrypted message is tampered with or otherwise accessed during message communication/transmission. In accordance with embodiments of the present invention, the quantum-level encrypted message is configured to change quantum particle states in response to at least an attempt to access the message. The attempt to access may include, but is not limited to, intercepting/observing the message, reading the message, writing from the message, logging the message, storing the message or the like.

In specific embodiments of the invention the quantum-level encrypted messages are logically programmed such that the quantum particle state changes to a specific state that corresponds to the type of access. In additional embodiments of the invention, the quantum-level encrypted messages may be logically programmed to record the type of access in an unencrypted block of the message.

In other embodiments of the invention, a neural network database is implemented that stores empirical data associated with previous unauthorized accessed quantum-level encrypted messages. In such embodiments of the invention, the type of access may be determined by analyzing the empirical data, such as, comparing the particle state change of the currently accessed quantum-level encrypted message to particle state changes of historical quantum-level encrypted messages that were previously accessed. In addition to determining the type of access, analyzing the empirical data may also provide for determining entities and/or nodes/infrastructure that accessed the message.

A system for determining a type of unauthorized access during communication of a quantum-level encrypted message defines first embodiments of the invention. The system includes a first computing apparatus having a first memory and at least one first processor. The memory stores one or more encryption algorithms. The first processor(s) is configured to encrypt a message using at least one of the encryption algorithms and at least one quantum encryption keys that are generated using a first quantum particle state, and initiate communication of the message to a predetermined message recipient. In response to at least an attempt to access the message during communication of the message to the predetermined recipient, the quantum particle state changes from the first quantum particle state to a second quantum particle state. The system further includes a second computing apparatus in possession or control of the predetermined message recipient and having a second memory and at least one second processor. The second memory stores one or more decryption algorithms. The at least one second processor is configured to receive the message, attempt to decrypt the message using at least one of the decryption algorithms and at least one quantum decryption keys that are generated using the first quantum particle state, and in response to failing to decrypt the message as a result of the quantum particle state changing from the first quantum particle state to a second particle state, determine the type of unauthorized access that occurred during communication of the message.

In specific embodiments of the system, the second processor of the second computing device is configured to determine the type of unauthorized access from amongst at least one of the following types of access (i) intercepting/observing the message (ii) reading data in the message (iii) writing data from the message, (iv) logging the message, and (v) storing the message.

In further specific embodiments of the system, the second processor of the second computing device is configured to determine the type of unauthorized access based on the second quantum particle state, such that, each type of unauthorized access corresponds to a different change in quantum particle state. In other words, the type of access will dictate how the quantum particle state changes.

In other embodiments the system includes a neural network database that stores empirical data associated with previous changes in quantum particle states resulting from attempts to access a message during communication. In such embodiments of the system, the second processor of the second computing device is configured to determine the type of unauthorized access based on analyzing the empirical data stored in the neural network database. Moreover, in further specific embodiments of the system, analyzing the empirical data stored in the neural network database includes comparing the quantum particle state change undergone by the message to previous changes in quantum particle states to determine the type of unauthorized access. In further related embodiments of the system, analyzing the empirical data stored in the neural network database further results in determination of at least one of (i) a party to the unauthorized access, and (ii) infrastructure used to perform the unauthorized access.

In other specific embodiments of the system, the second processor of the second computing device is configured to determine the type of unauthorized access based on reading data logged in an unencrypted block within the message. In such embodiments of the data defines the type of access.

A method for determining a type of unauthorized access during communication of a quantum-level encrypted message defines second embodiments of the invention. The method includes encrypting, by a computing processor, a message using at least one of the encryption algorithms and at least one quantum encryption keys that are generated using a first quantum particle state and initiating, by a computing processor, communication of the message to a predetermined message recipient. The method further includes in response to at least an attempt to access the message during communication of the message to the predetermined recipient, changing the quantum particle state from the first quantum particle state to a second quantum particle state. In addition the message includes receiving, by a computing processor, the message by the predetermined message recipient and attempting, by a computing device processor, to decrypt the message using at least one decryption algorithm and at least one quantum decryption keys that are generated using the first quantum particle state. Additionally, the method includes, in response to failing to decrypt the message, determining, by a computing device processor, the type of unauthorized access that occurred during communication of the message.

In specific embodiments of the method, determining the type of access further includes determining one or more of (i) observing/intercepting the message, (ii) reading data in the message, (iii) writing data from the message, (iv) logging the message, and (v) storing the message.

In specific embodiments of the method, determining the type of access includes determining the type of access based on types of unauthorized access corresponding to a different changes in particle state.

In other specific embodiments of the method, determining the type of access further includes determining the type of access by accessing a neural network database to analyze empirical data associated with previous changes in quantum particle states resulting from attempts to access a message during communication. In such embodiments of the method, accessing the neural network further includes accessing the neural network to analyze the empirical data by comparing the quantum particle state change to previous changes in quantum particle states to determine the type of unauthorized access. In additional related embodiments of the method, accessing the neural network further includes accessing the neural network to analyze the empirical data to determine at least one of (i) a party to the unauthorized access, and (ii) infrastructure used to perform the unauthorized access.

In other specific embodiments of the method, determining the type of access further includes determining the type of access based on reading data logged in an unencrypted block within the message, such that, the data defines the type of access.

A computer program product for determining a type of unauthorized access during communication of a quantum-level encrypted message defines third embodiments of the invention. The computer program product includes a non-transitory computer-readable medium having a set of codes. The set of codes at least one computer to encrypt a message using at least one of the encryption algorithms and at least one quantum encryption keys that are generated using a first quantum particle state and initiate electronic communication of the message to a predetermined message recipient. In response to at least an attempt to access the message during communication of the message to the predetermined recipient, changing the quantum particle state from the first quantum particle state to a second quantum particle state. The set of codes are further configured to cause the at least one computer to receive the message by the predetermined message recipient and attempt to decrypt the message using at least one decryption algorithm and at least one quantum decryption keys that are generated using the first quantum particle state. In response to failing to decrypt the message, determine the type of unauthorized access that occurred during communication of the message.

In specific embodiments of the computer program product, the set of codes for causing the at least computer to determine the type of access further comprises the set of codes for causing the at least one computer to determine the type of access from amongst the group of one or more of (i) observing/intercepting the message, (ii) reading data in the message, (iii) writing data from the message, (iv) logging the message, and (v) storing the message.

In further specific embodiments of the computer program product the set of codes for causing the at least computer to determine the type of access based on types of unauthorized access corresponding to a different changes in particle state.

In other specific embodiments of the computer program product, the set of codes for causing the at least computer to determine the type of access further include the set of codes for causing the at least one computer to determine the type of access by accessing a neural network database to analyze empirical data associated with previous changes in quantum particle states resulting from attempts to access a message during communication. In related embodiments of the computer program product, the set of codes further comprise a set of codes for causing the at least one computer to access the neural network to analyze the empirical data to determine at least one of (i) a party to the unauthorized access, and (ii) infrastructure used to perform the unauthorized access.

Thus, systems, apparatus, methods, and computer program products herein described in detail below provide for determining the type of unauthorized access that occurs when a quantum-level encrypted message is tampered with or otherwise accessed during message communication/transmission. The quantum-level encrypted message is configured to change quantum particle states in response to at least an attempt to access the message. The messages may be logically programmed such that the message records, in an encrypted block, the type of access or the type of access may correspond to a quantum particle state. In other embodiments, a neural network storing empirical data associated with previous quantum-level encrypted messages that have been accessed is analyzed to determine the type of unauthorized access and, in some embodiments, the entity, nodes or infrastructure associated with the unauthorized access.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, as described in more detail below, the present invention provides for determining the type of unauthorized access that occurs when a quantum-level encrypted message is tampered with or otherwise accessed during message communication/transmission. In accordance with embodiments of the present invention, the quantum-level encrypted message is configured to change quantum particle states in response to at least an attempt to access the message. The attempt to access may include, but is not limited to, intercepting/observing the message, reading the message, writing from the message, logging the message, storing the message or the like.

In specific embodiments of the invention the quantum-level encrypted messages are logically programmed such that the quantum particle state changes to a predetermined specific state that corresponds to the type of access. For example, an attempt to read the message may correspond to a change to a first quantum particle state, an attempt to store the message may correspond to a change to a second quantum particle state and the like. In additional embodiments of the invention, the quantum-level encrypted messages may be logically programmed to record the type of access in an unencrypted block of the message.

In other embodiments of the invention, a neural network database is implemented that stores empirical data associated with previous unauthorized accessed quantum-level encrypted messages. In such embodiments of the invention, the type of access may be determined by analyzing the empirical data, such as, comparing the particle state change of the currently accessed quantum-level encrypted message to particle state changes of historical quantum-level encrypted messages that were previously accessed. In addition to determining the type of access, analyzing the empirical data may also provide for determining entities and/or nodes/infrastructure (i.e., hardware and/or software) that accessed the message.

Figure 1:
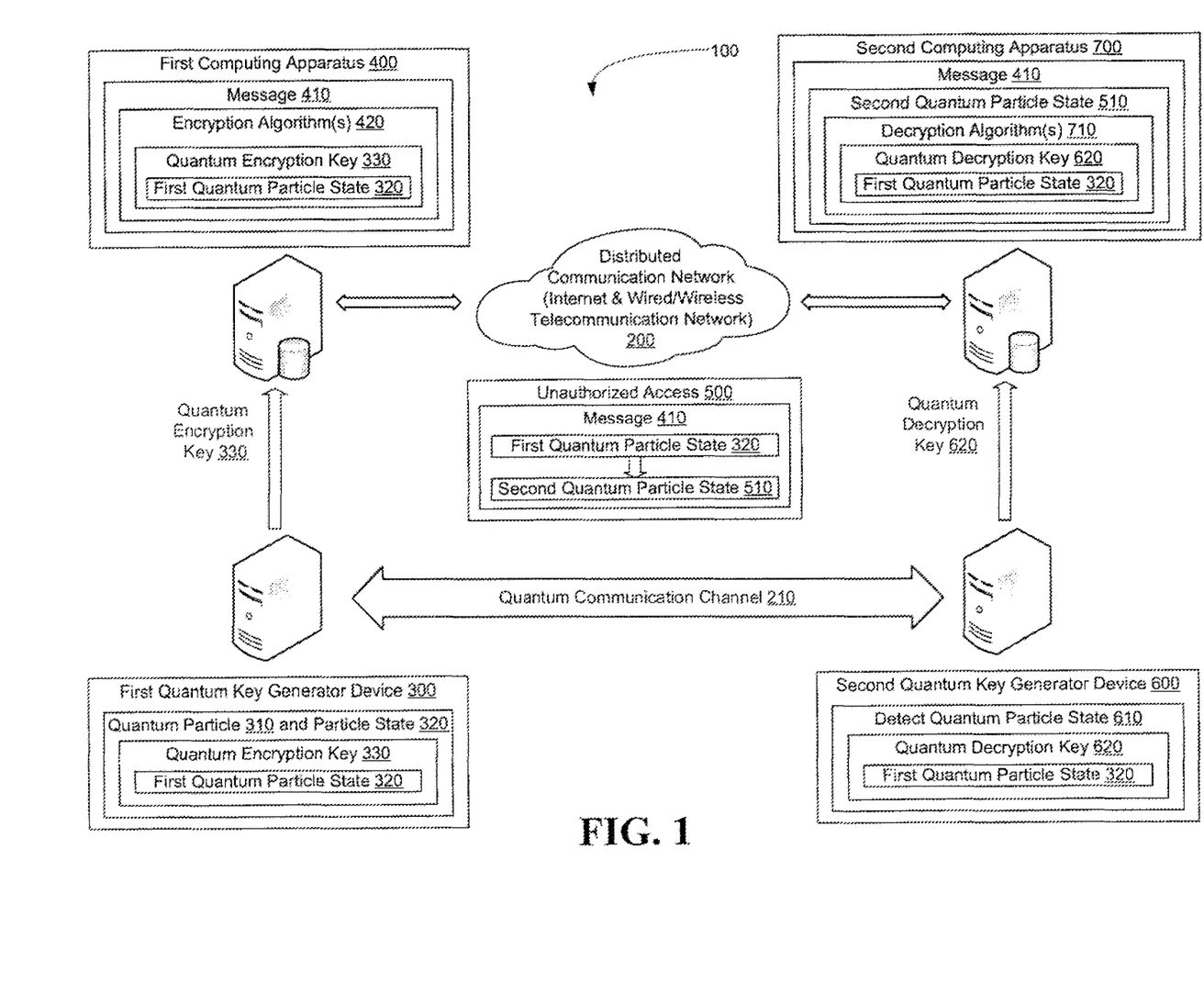
FIG. 1 provides a schematic diagram of an exemplary system for insuring secure communication of a quantum-level encrypted message, in accordance with embodiments of the present invention.

Referring to FIG. 1, a schematic diagram is provided of a system 100 for insuring the security of quantum-level encrypted messages, in accordance with embodiments of the present invention. The system 100 insures the security by changing the quantum particle state of the message in response to at least an attempt to access or otherwise tamper with the message during communication/transmission of the message. Once the quantum particle state changes, the data in the message is corrupted (i.e., rendered incomprehensible). The system includes a first quantum key generator device 300 that implements a first quantum processor and/or optimizer (not shown in FIG. 1) to provide for a quantum particle 310 and a corresponding first quantum particle state 320 and generate at least one quantum encryption key 330 based on the first quantum particle state 320. In some embodiments of the system, the first quantum particle key generator device 300 is in synchronized communication, via quantum communication channel 210, with a second quantum key generator device 600 that is in possession of otherwise controlled to an intended message/data recipient. The quantum communication channel 210 may comprise optical fiber, free space or the like as the means for synchronized communication. The second quantum key generator device 600 implements a first quantum processor and/or optimizer (not shown in FIG. 1) that is configured to detect 610 the first quantum particle state 320 used to generate the quantum encryption key(s) 330 and generate quantum level decryption key(s) 620 using the first quantum particle state 440. In specific embodiments of the invention the synchronized quantum communication channel 210 provides for the generation of the quantum encryption key(s) 330 and the quantum decryption keys 620 substantially simultaneously (i.e., in real-time or near real-time).

The first quantum key generator 300 device and the aforementioned second quantum key generator device 600 may be configured as stand-alone devices that are configured for the sole purpose of generating quantum encryption/decryption keys. The quantum key generator devices 300 and 600 are configured to provide quantum-level computing. As used herein, a quantum key generator device is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computing apparatus implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computing apparatus: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Embodiments of the present invention make use of quantum ability of optimization by utilizing a quantum computing device in conjunction with a classical/binary computer to encrypt and decrypt messages at a quantum-level. Such a configuration enables the present invention to take advantage of quantum computing's ability to be in a superposition (i.e., quantum particle states) of different states simultaneously.

The system additionally, includes a first computing apparatus 400 that is configured to receive the quantum encryption key(s) 330 from the first quantum key generator device 300 and implement one or more encryption algorithms 420 and the quantum encryption key(s) 330 to encrypt a message 410 and initiate communication of the message to a predetermined message recipient via a distributed communication network 200, such as the Internet and/or wired/wireless telecommunication network(s) or the like.

In response to at least an attempt to access 500 the message 410 (otherwise referred to as tampering with the message 410) during the communication/transmission of the message from the message sender (i.e., the first computing apparatus 400) to the intended recipient (i.e., the second computing apparatus 700), the quantum particle state changes from the first particle state 340 to a second particle state 510. The particle state change is precipitated by the quantum encryption key 330 and/or encryption algorithms 420 that is/are configured to recognize attempts to access 500 the message during transmission/communication and trigger the change in quantum particle state. Attempts to access may include, but are not limited to (i) intercepting or attempting to intercept the message during communication, (ii) observing or attempting to observe the message during communication, (iii) reading or attempting to read the message during communication, (iv) writing or attempting to write to the message during communication, (v) logging or attempting to log the message, and/or (vi) storing or attempting to store the message. As previously discussed, the changing of the quantum particle state corrupts the data in the message, such that, the message is incomprehensible.

In some embodiments of the invention, the system 100 includes a second computing apparatus 700 that is associated with the intended massage recipient. The second computing apparatus is configured to receive the quantum decryption key(s) 620 from the second quantum key generator device 600 and implement one or more decryption algorithms 710 and the quantum decryption key(s) 620 to attempt to decrypt the message 410. In this regard, second computing apparatus 700 is configured to receive the message 410, however; since the decryption algorithm 710 uses a quantum decryption key 620 based on the first quantum particle state 440 and the message has changed to the second quantum particle step 510 (due to tampering), the decryption algorithm 710 is unable to decrypt the message. In response to the decrypt algorithm 710 being unable to decrypt the message 410 a determination is made that the message 410 has at least been attempted to be accessed (i.e., tampered with) during the communication and appropriate actions are triggered. In specific embodiments of the system, appropriate actions may include, but are not limited to, determining the type of access, the entity that accessed and/or the nodes/infrastructure associated with the access and/or generating and communicating alerts to the message sender, notifying the message sender of the unauthorized access and the need to resend the message and internal alerts to parties within the intended recipient notifying the parties of the unauthorized access.

Figure 2:
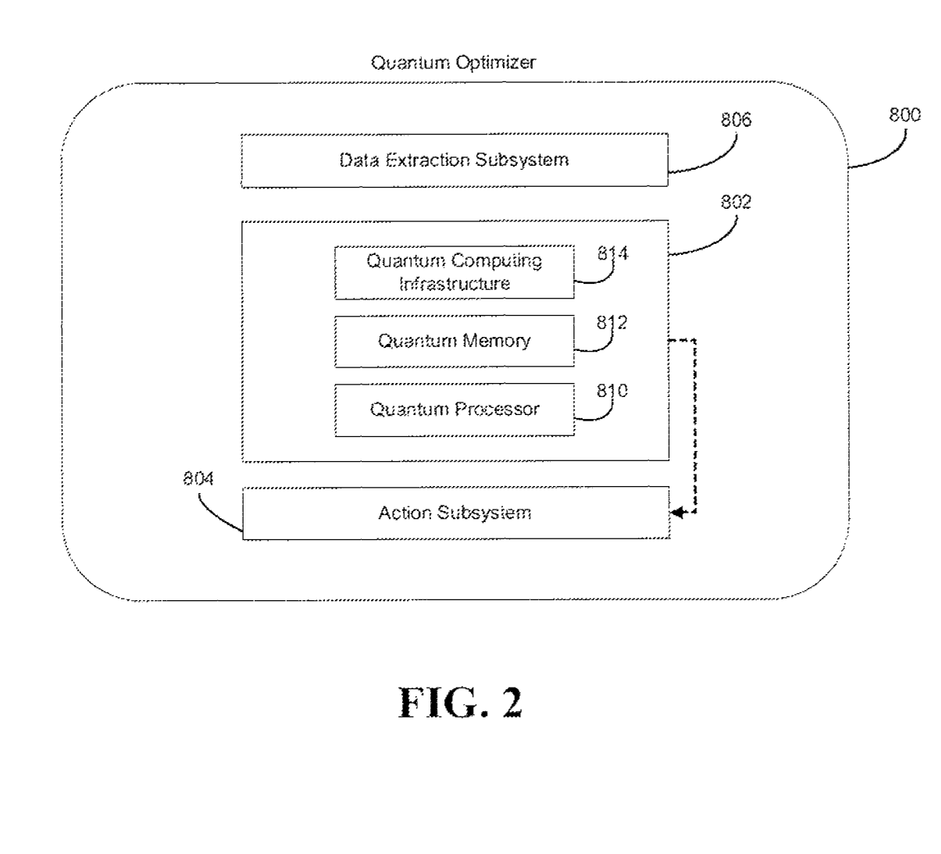
FIG. 2 provides a block diagram of a quantum optimizer apparatus, in accordance with embodiments of the present invention.

FIG. 2 is a block diagram of an exemplary quantum optimizer 800 that can be used in parallel with a classical computer to solve optimization problems. The quantum optimizer 800 is comprised of a data extraction subsystem 806, a quantum computing subsystem 802, and an action subsystem 804. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the data extraction subsystem 806 communicates with the network to extract data for optimization, such as encryption key generation. It will be understood that any method of communication between the data extraction subsystem 806 and the network is sufficient, including but not limited to wired communication, Radiofrequency (RF) communication, BLUETOOTH®, WIFI®, and the like. The data extraction subsystem 806 then formats the data for optimization in the quantum computing subsystem 802.

As further depicted in FIG. 2, the quantum computing subsystem 802 comprises a quantum computing infrastructure 814, a quantum memory 812, and a quantum processor 810. The quantum computing infrastructure 814 comprises physical components for housing the quantum processor 810 and the quantum memory 810. The quantum computer infrastructure further comprises a cryogenic refrigeration system to keep the quantum computing subsystem 802 at the desired operating temperatures. In general, the quantum processor 810 is designed to perform adiabatic quantum computation and/or quantum annealing to optimize data received from the data extraction subsystem 806. The quantum memory 812 is comprised of a plurality of qubits used for storing data during operation of the quantum computing subsystem 802. In general, qubits are any two-state quantum mechanical system. It will be understood that the quantum memory 812 may be comprised of any such two-state quantum mechanical system, such as the polarization of a single photon, the spin of an electron, and the like.

The action subsystem 804 communicates the optimized data from the quantum computing subsystem 802 over the network. It will be understood that any method of communication between the data extraction subsystem 806 and the network is sufficient, including but not limited to wired communication, Radiofrequency (RF) communication, BLUETOOTH®, WIFI®, and the like.

Figure 3:
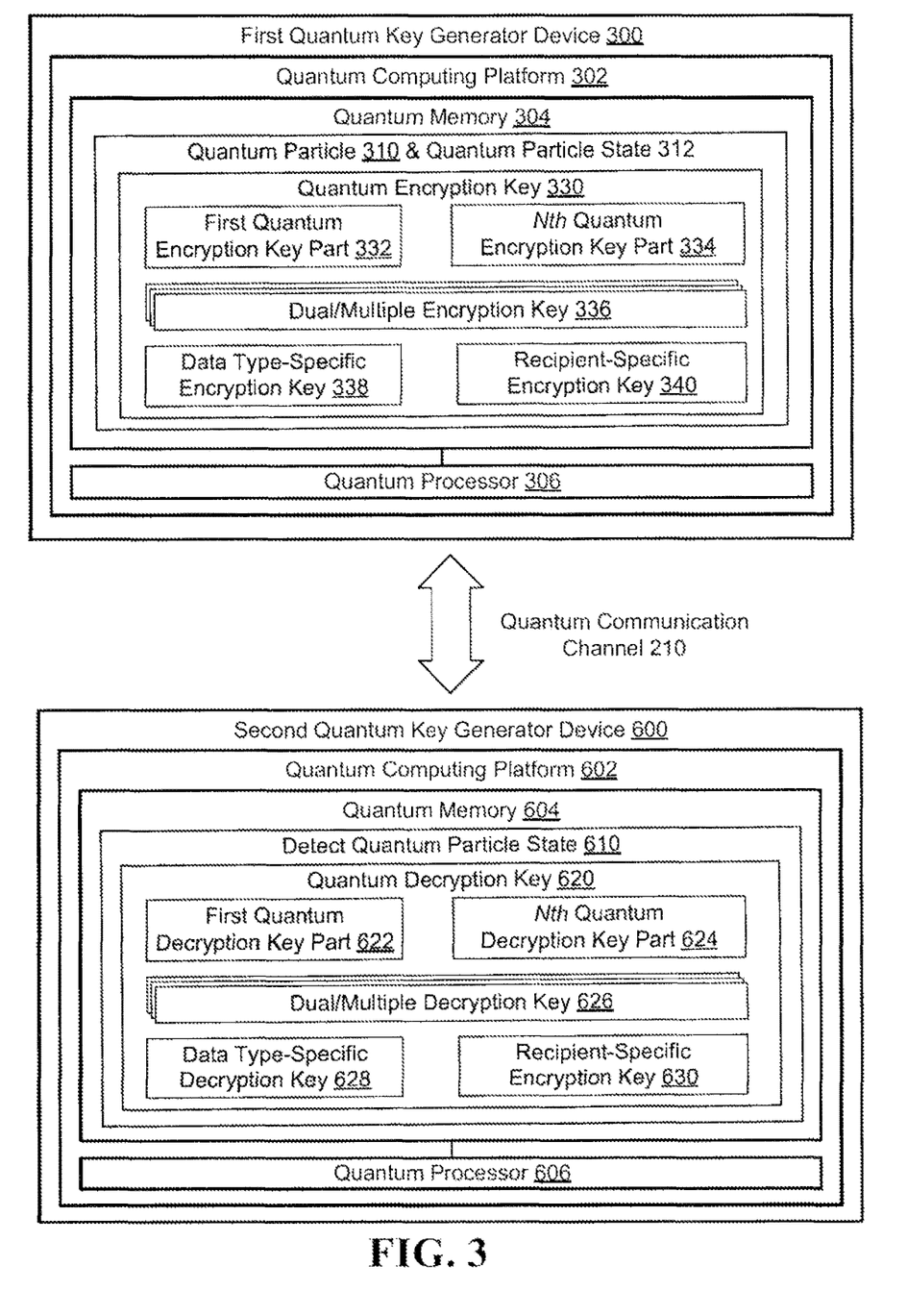
FIG. 3 provides a block diagram of quantum key generator devices, in accordance with embodiments of the present invention.

Referring to FIG. 3 a block diagrams are presented of first and second quantum key generator devices 300 and 600, in accordance with embodiments of the present invention. As previously discussed, first quantum key generator device 300 is in synchronized communication with the second quantum key generator device 600 via quantum communication channel 210, which may comprise an optical fiber, free space or the like. The synchronized communication channel allows for the second quantum key generator device 600 to detect the quantum particle state used by the first quantum key generator device 300 to generate the quantum encryption keys 330 (or vice versa) and simultaneously generate quantum decryption keys 620 using the same quantum particle state.

First quantum key generator 300 includes a quantum computing platform 302, such as the platform shown and described in FIG. 2. The quantum computing platform 302 includes a quantum memory 304 in communication with a quantum processor 306. The quantum processor 306 is configured to provide for a quantum particle 310 and an associated quantum particle state 312 and generate one or more quantum encryption keys 330 based on the quantum particle state 312.

Second quantum key generator 600 includes a quantum computing platform 602, such as the platform shown and described in FIG. 2. The quantum computing platform 602 includes a quantum memory 604 in communication with a quantum processor 606. The quantum processor 606 is configured to detect 610 the quantum particle state 312 used by the first quantum key generator device 300 to generate corresponding decryption keys 620 or vice versa (i.e., quantum processor 606 is configured to generate encryption keys using a quantum particle state that is detected by the quantum processor of the first quantum key generator device to generate decryption keys).

In specific embodiments of the invention, the quantum processor 306 is configured to generate a single quantum encryption key 330 and segment or otherwise split the quantum encryption key 330 into two or more parts or segments, such as, first quantum encryption key part 332 up to and including the Nth quantum key part 334. In such embodiments of the invention quantum processor 606 is configured to generate a corresponding quantum decryption key 620 based on the quantum particle state and segment or otherwise split the quantum decryption key 620 into corresponding parts or segments, such as, first quantum decryption key part 622 up to and including the Nth quantum key part 624. In such embodiments of the invention a predetermined number of the quantum key parts (commonly referred to as a quorum) may be required to perform an action. For example, a predetermined number of the quantum key decryption parts may be need to decrypt a message, electronically sign a document or the like.

In other specific embodiments of the invention, the quantum processor 306 is configured to generate dual or multiple quantum encryption keys 336. In such embodiments of the invention quantum processor 606 is configured to generate corresponding dual or multiple quantum decryption keys 626 based on the quantum particle state. In such embodiments of the invention a predetermined number of the dual or multiple encryption/decryption keys (commonly referred to as a quorum) may be required to perform an action. For example, a predetermined number of the quantum encryption or decryption keys may be need to decrypt a message, electronically sign a document or the like.

In other specific embodiments of the invention, the first and second quantum key generator devices 300 and 600 are configured to generate data type-specific quantum encryption/decryption keys 338 and 628 and/or recipient-specific quantum encryption/decryption keys 340 and 630. Data type-specific quantum encryption/decryption keys are limited in use to quantum encrypting and decrypting of the associated data type. For example, one quantum encryption/decryption keys may be designated for encrypting/decrypting transaction data and another quantum encryption/decryption keys may be designated for encrypting/decrypting text data and the like. Recipient-specific quantum encryption/decryption keys are limited in use to quantum encrypting and decrypting messages/data for the associated specific recipient. For example, one quantum encryption/decryption key may be designated for a first recipient and another quantum encryption/decryption key may be designated for second recipient and the like. In this regard, the first and/or second quantum key generator devices 300 and 600 may not be in a 1:1 relationship with each other, but, rather may be in synchronized quantum communication with multiple quantum key generator devices. In addition, the first and second quantum key generator devices 300 and 600 may be configured to generate quantum encryption/decryption keys that are both data type specific and recipient specific.

Figure 4:
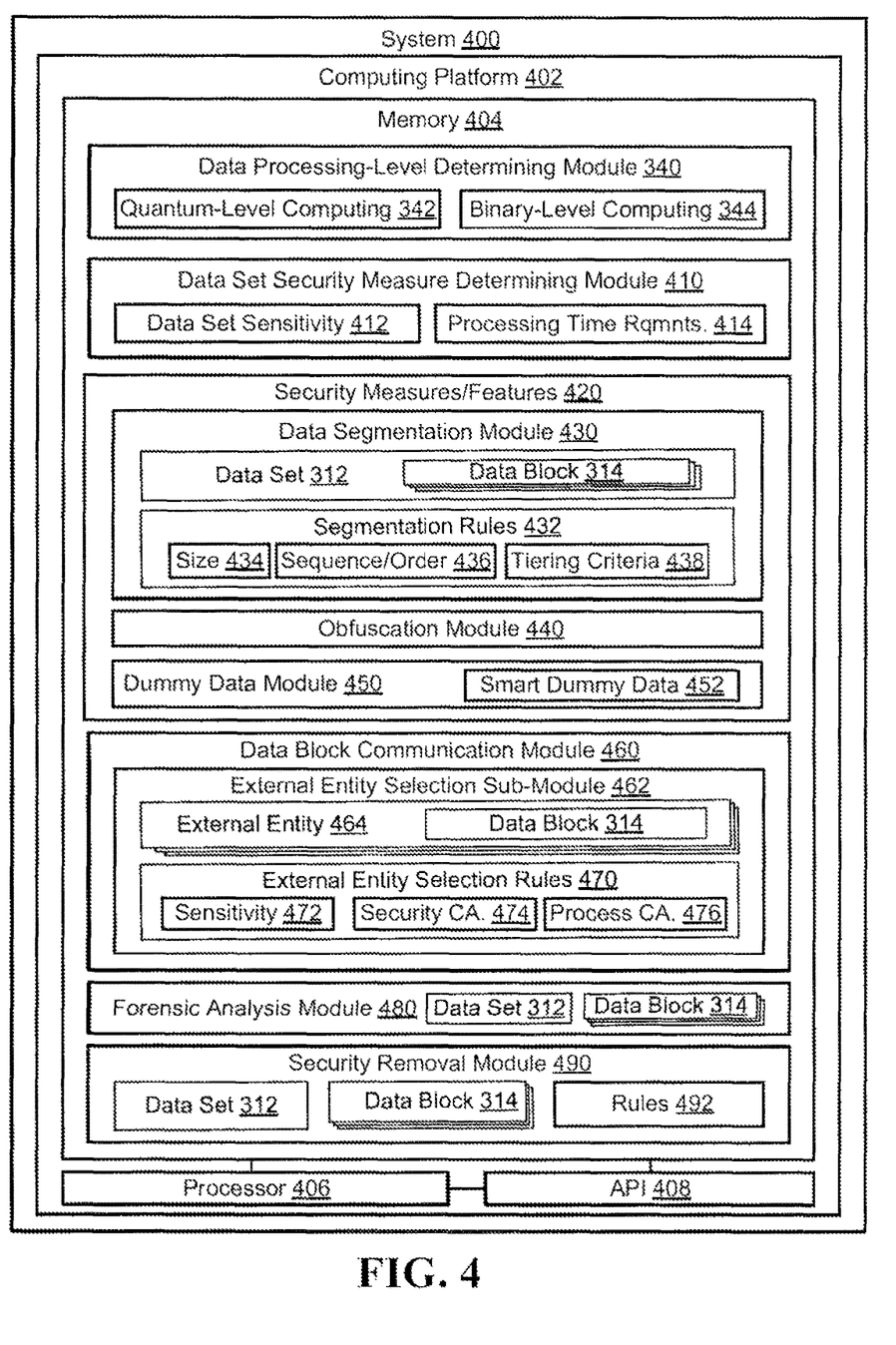
FIG. 4 provides a block diagram of computing apparatus configured for encrypting/decrypting quantum-level encrypted messages and determining the type of access for a message that has been tampered with/accessed during communication, in accordance with embodiments of the present invention.

Referring to FIG. 4, block diagrams are shown of first and second computing apparatus 400 and 700 configured for encrypting and decrypting quantum-level encrypted messages and performing other functions in accordance with embodiments of the present invention. The apparatus 400 and 700 may include one or more of any type of computing device, such as one or more servers, personal computers or the like. The present systems, methods and computer program products can accordingly be performed and/or implemented on any form of one or more computing devices.

The apparatus 400 and 700 includes a computing platform 402 and 702 that can receive and execute algorithms, such as models, routines, and applications. Computing platform 402 and 702 includes corresponding memory 404 and 704, which may comprise volatile and non-volatile memory, such as read-only and/or random-access memory (RAM and ROM), EPROM, EEPROM, flash cards, or any memory common to computer platforms. Further, memory 404 and 704 may include one or more flash memory cells, or may be any secondary or tertiary storage device, such as magnetic media, optical media, tape, or soft or hard disk. Moreover, memory 404 and 704 may comprise cloud storage, such as provided by a cloud storage service and/or a cloud connection service.

Further, computing platform 402 and 702 also includes one or more conventional or classical processors 406 and 706, which may be an application-specific integrated circuit ("ASIC"), or other chipset, processor, logic circuit, or other data processing device. Processors 406 and 706 or other processor such as ASIC may execute an application programming interface ("API") (not shown in FIG. 4) that interfaces with any resident programs, such as encryption/decryption algorithms 420 and 701, alert module 720 and access type determination module 730 and routines, sub-modules associated therewith or the like stored in the memory 404 and 704 of the apparatus 400 and 700.

Processor 406 and 706 includes various processing subsystems (not shown in FIG. 4) embodied in hardware, firmware, software, and combinations thereof, that enable the functionality of the apparatus 400 and 700 and the operability of the apparatus 400 and 700 on a network, such as distributed computing network 200. For example, processing subsystems allow for initiating and maintaining communications and exchanging data with other networked devices shown in FIG. 1 and FIG. 5. For the disclosed aspects, processing subsystems of processor 406 and 706 may include any subsystem used in conjunction with encryption/decryption algorithms 420 and 701, alert module 720 and access type determination module 730 and related algorithms, sub-algorithms, modules, sub-modules thereof.

Computer platform 402 and 702 may additionally include communications module (not shown in FIG. 4) embodied in hardware, firmware, software, and combinations thereof, that enables communications among the various components of the apparatus 400 and 700, as well as between the other networked devices. Thus, communication module may include the requisite hardware, firmware, software and/or combinations thereof for establishing and maintaining a network communication connection and initiating communication of and receiving quantum-level encrypted messages 410.

In specific embodiments of the apparatus 400, the memory 404 stores one or more encryption algorithms 420 that are configured to encrypt message 410 using the one or more quantum encryption keys 330 generated using the first quantum particle state 340.

Further, the memory 707 of apparatus 700 stored one or more corresponding decryption algorithms 710 that are configured to attempt to decrypt message 410 using the one or more quantum decryption keys 620 generated using the first quantum particle state 340. In accordance with embodiments of the present invention, in which the quantum state of the quantum-level encrypted message 410 has changed from the first quantum particle state 340 to the second quantum particle state 510 due to tampering/unauthorized access during the communication/transmission, the decryption algorithm(s) 710 is prevented from decrypting the message.

As such, according to specific embodiments of the invention, the memory 704 of second computing apparatus 700 stores alert module 720 that is configured to, in response to determining that a message 410 cannot be decrypted and/or that the quantum particle state has changed, generate and initiate communication of an alert. The alert may take the form of a message sender alert 722 that notifies the message sender of (i) the inability to decrypt the message and/or (ii) the unauthorized access of the message during communication and, in some embodiments, requests that the message sender resend the message. In other embodiments, the alert may take the form of an internal message recipient alert sent to one or more internal entities, to notify the internal message recipient entities (i) that the message was unable to be decrypted and/or (ii) the unauthorized access of the message during communication.

In other embodiments of the invention, the memory 704 of second computing apparatus 700 stores access type determination module 730 that is configured to determine the type of unauthorized access or tampering undergone by the message 410 during communication/transmission. As previously discussed accede type may include, but is not limited to, (i) intercepting or attempting to intercept the message during communication, (ii) observing or attempting to observe the message during communication, (iii) reading or attempting to read the message during communication, (iv) writing or attempting to write to the message during communication, (v) logging or attempting to log the message, and/or (vi) storing or attempting to store the message. In specific embodiments of the invention, the determination of access type is conducted by heuristic analysis 732 of empirical data stored in a neural network database. In such embodiments of the invention the change in quantum particle state (from the first quantum particle state to the second quantum particle state) associated with the message is compared to historical data associated with previous messages that experienced changes in quantum particle states and have an identified access type. In other specific embodiments of the invention, in which the message is logically programmed to capture access type data in an unencrypted block of the message, the determination of access type comprises reading 734 the access type data from the unencrypted block of the message. In still further specific embodiments of the invention, in which quantum particle states are associated with specific access types, determination of the access type provides for correlating 736 the quantum particle state to the previously associated access type.

Figure 5:
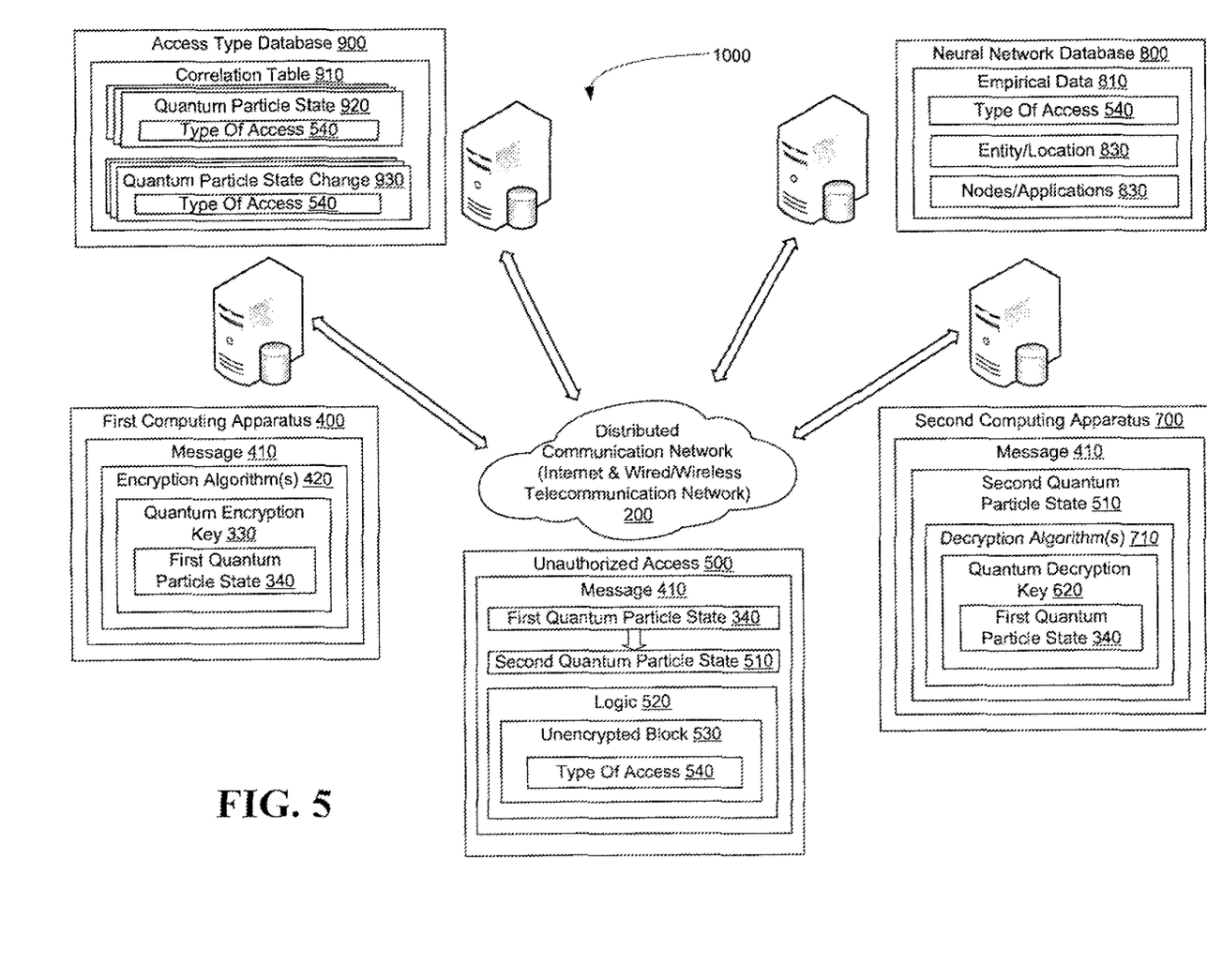
FIG. 5 provides a schematic diagram of system for determining the type of access for a quantum-level encrypted message that has been tampered with/accessed during communication/transmission, in accordance with embodiments of the present invention.

Referring to FIG. 5 a schematic diagram is presented of a system 1000, for determining access type for a quantum-level encrypted message that has been accessed/tampered with during communication/transmission, in accordance with embodiments of the present invention. The system includes a first computing apparatus 400 that is configured to receive the quantum encryption key(s) 330 from the first quantum key generator device 300 (shown in FIG. 1) and implement one or more encryption algorithms 420 and the quantum encryption key(s) 330 based on the first quantum particle state 340 to encrypt a message 410 and initiate communication of the message to a predetermined message recipient via a distributed communication network 200, such as the Internet and/or wired/wireless telecommunication network(s) or the like. The system additionally includes a second computing apparatus 700 in possession or control of the intended recipient that is configured to receive the message 410 and attempt to decrypt the message using one or more corresponding decryption algorithms 710 and quantum decryption keys 620 based on the first quantum particle state 340.

In the event that the message is accessed 500 or otherwise tampered with during the communication/transmission of the message from the first computing apparatus 400 to the second computing apparatus 700, the quantum encrypted message 410 is configured to change quantum particle state, i.e., change from a first particle state 340 to a second particle state 510. As a result of the quantum particle state change, the decryption algorithm(s) 710 are unable to decrypt the message. In response to being unable to decrypt the message, the second computing apparatus 700 is configured to determine the type of access that the message 410 experienced during transmission.

In specific embodiments of the system 1000, the message 410 may include logic 520 that is configured to record, in an unencrypted block 530 of the message, data associated with the type of access 540. In this regard, the logic may record all of the actions undergone by the message during communication or, in other embodiments, record only the unforeseen (i.e., unauthorized) actions undergone by the message 410. In such embodiments of the invention, determination of the access type comprises reading the data in the unencrypted block of the data to determine the access type. In those embodiments in which the logic 510 is configured to record all actions encountered by the message during transmission, the determination of access type may involve determining which actions were authorized and which actions were associated with unauthorized access/tampering.

In other specific embodiments of the invention, the quantum particle states or the changes in quantum particle state may be associated with a corresponding type or types of access. For example, if a message changes to a specific quantum particle state or if the message changes from one specific quantum particle state to another specific quantum particle state, the specific quantum particle state or the specific change in quantum particle state may be correlated to a specific access type or access types (i.e., a pattern of two or more access types). In such embodiments of the invention the determination of access type may include accessing an access type database 900 that stores a correlation table 910 that correlates quantum particle states 920 or quantum particle state changes 930 to type of access 540 or multiple types of access 540.

In still further embodiments of the invention, determination of the access type may provide for accessing a neural network database 800 to analyze empirical data 810 associated with previous messages that were found to be accessed/tampered with and have an identified access type or access type(s). In this regard, analyzing the empirical data 810 entails comparing the quantum particle state or the quantum particle state change in the current message to quantum particle states or quantum particle state changes in the previous messages to determine similarities and/or patterns so as to heuristically determine, to a reasonable level of certainty, what type of access or types of access occurred in the current message. In addition to determining the type of access, heuristic analysis of the empirical data may also provide for determining the entity and/or location 830 of the unauthorized access and/or the types of nodes/hardware or types of applications/operating systems/software 840 associated with the unauthorized access/tampering.

Figure 6:
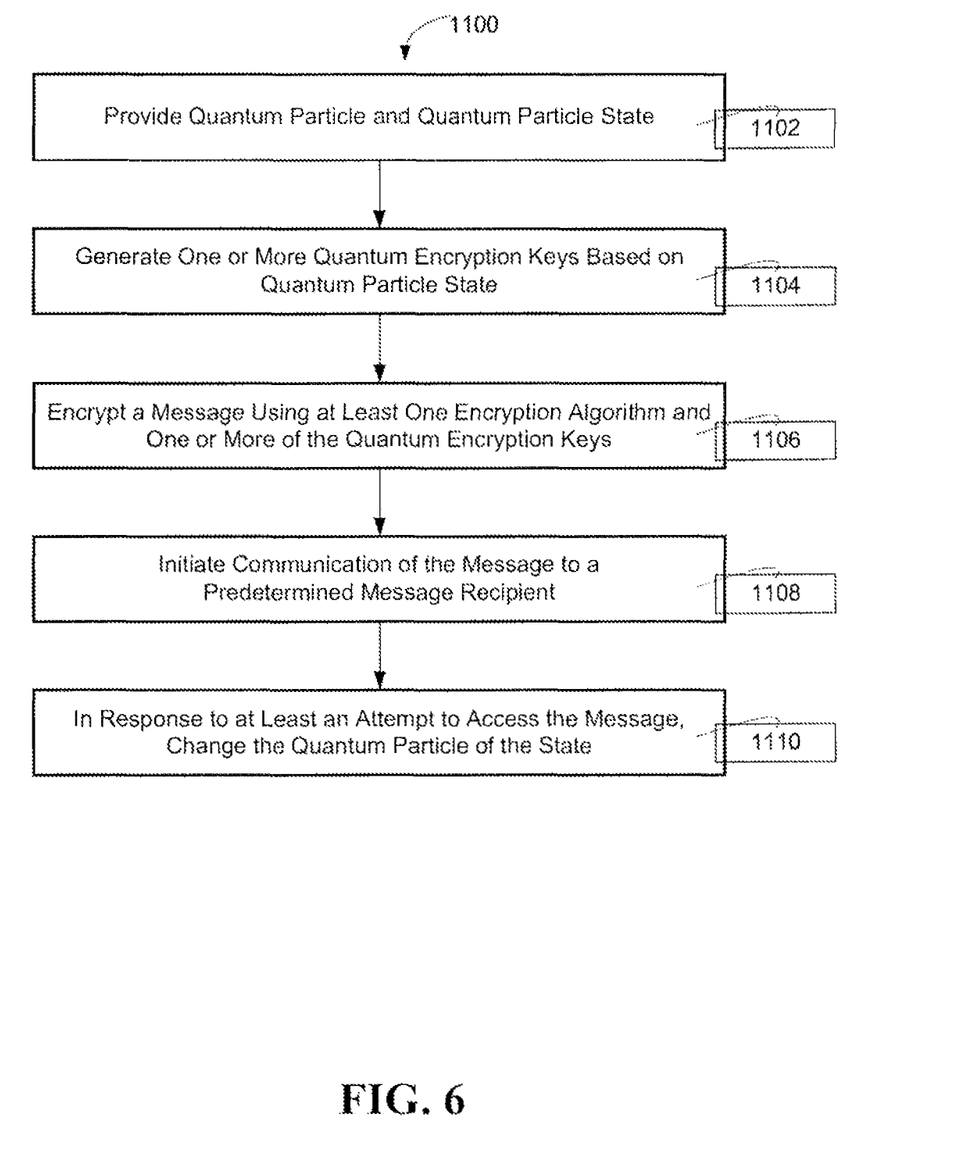
FIG. 6 provides a flow diagram of a method for insuring secure communication of a quantum-level encrypted message, in accordance with embodiments of the present invention.

Referring to FIG. 6 a flow diagram is depicted of a method 110 for insuring secure communication of a quantum-level encrypted message, in accordance with embodiments of the present invention. At Event 1102, a quantum particle and corresponding quantum particle state are provided for. At Event 1004, one or more quantum encryption keys are generated based on the quantum particle state. The quantum encryption keys are configured such that the quantum particle state of a message encrypted with the keys will change quantum particle state in response to the message being accessed or tampered with during communication of the message. In specific embodiments of the invention, dual or multiple quantum encryption keys are generated. In other specific embodiments of the invention, a single quantum encryption key is generated and subsequently partitioned or split into two or more quantum encryption key segments or parts. In further specific embodiments of the invention, the quantum encryption keys may be data specific and/or recipient specific.

At Event 1106, a message is encrypted using at least one encryption algorithm and one or more of the quantum encryption keys and, at Event 1108, communication of the message to an intended recipient is initiated.

At Event 1110, in response to at least an attempt to access (i.e., observe, read, write, log, store or the like) the message during communication of the message, the quantum particle state of the encrypted message is changed. In response to the change in quantum particle state, the message is corrupted (i.e., the contents of the message are rendered incomprehensible).

Figure 7:
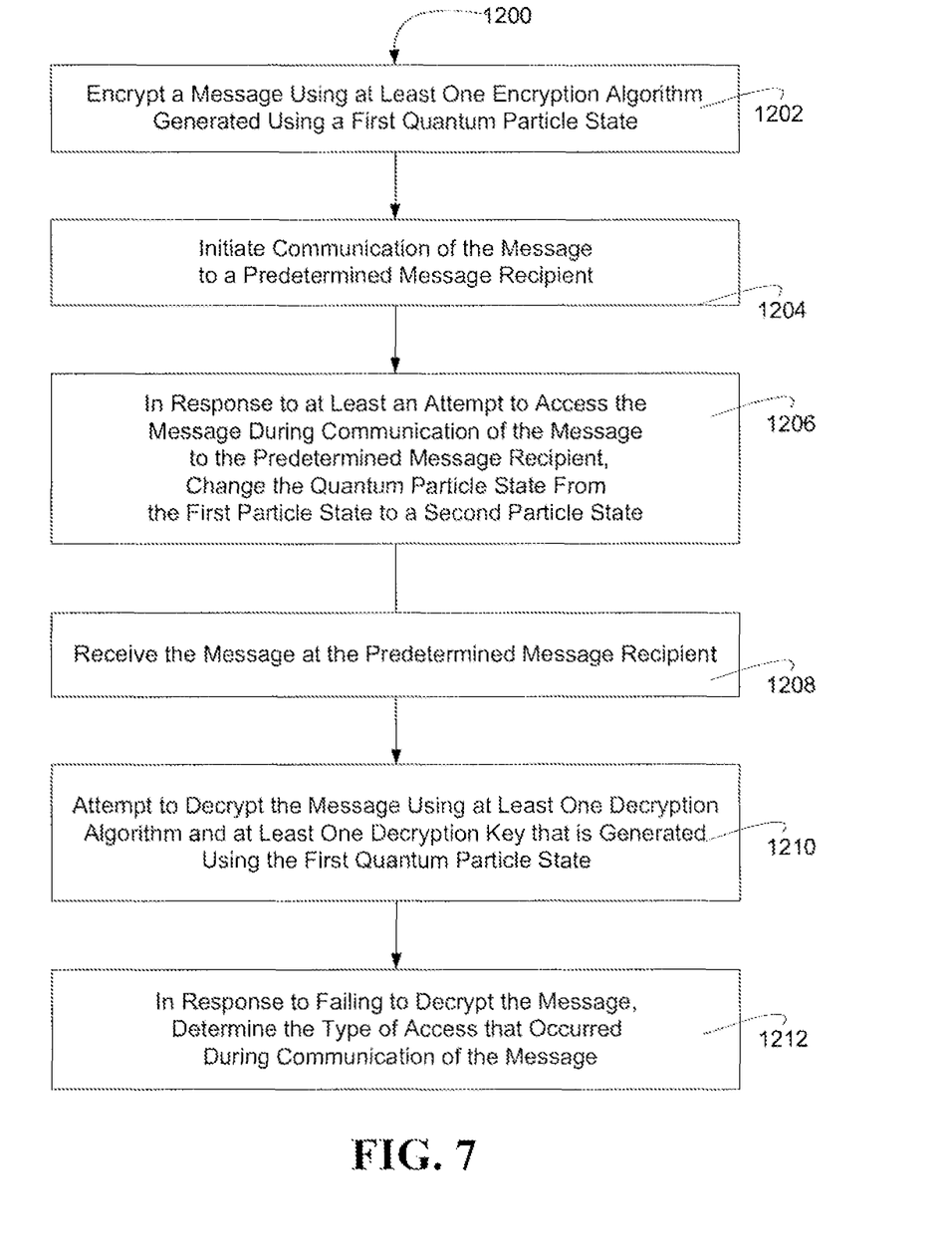
FIG. 7 provides a flow diagram of a method for determining the type of access for a quantum-level encrypted message that has been tampered with/accessed during communication/transmission, in accordance with embodiments of the present invention.

Referring to FIG. 7 a flow diagram is depicted of a method 1200 for determining the type of unauthorized access experiences by a quantum-level encrypted message during communication/transmission, in accordance with embodiments of the present invention. At Event 1202, a message is encrypted using at least one encryption algorithm generating using an encryption key based on a first quantum particle state and, at Event 1204, communication of the message is initiated to a predetermined message recipient.

At Event 1206, in response to at least an attempt to access the message during communication of the message to the predetermined message recipient, the quantum particle state of the quantum encrypted message changes from the first particle state to a second particle state. The change in quantum particle states corrupts the message, rendering the message incomprehensible.

At Event 1208, the message is received by the intended recipient and, at Event 1210, an attempt to decrypt the message is made using the at least one decryption algorithm and at least one quantum decryption key that was generated using the first quantum particle state. At Event 1212, in response to failing to decrypt the message, one or more types of access are determined for the message. The type(s) of access denoting what type of tampering occurred during transmission.

Thus, systems, apparatus, methods, and computer program products described above provide for determining the type of unauthorized access that occurs when a quantum-level encrypted message is tampered with or otherwise accessed during message communication/transmission. The quantum-level encrypted message is configured to change quantum particle states in response to at least an attempt to access the message. The messages may be logically programmed such that the message records, in an encrypted block, the type of access or the type of access may correspond to a quantum particle state. In other embodiments, a neural network storing empirical data associated with previous quantum-level encrypted messages that have been accessed is analyzed to determine the type of unauthorized access and, in some embodiments, the entity, nodes or infrastructure associated with the unauthorized access.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining a type of unauthorized access during communication of a quantum-level encrypted message, the system comprising:
a first computing apparatus having a first memory and at least one first processor, wherein the memory stores one or more encryption algorithms and wherein the at least one first processor is configured to:
encrypt a message using at least one of the encryption algorithms and at least one quantum encryption keys that are generated using a first quantum particle state, and
initiate communication of the message to a predetermined message recipient,
wherein in response to at least an attempt to access the message during communication of the message to the predetermined recipient, the quantum particle state changes from the first quantum particle state to a second quantum particle state; and
a second computing apparatus in control of the predetermined message recipient and having a second memory and at least one second processor, wherein the second memory stores one or more decryption algorithms and wherein the at least one second processor is configured to:
receive the message, attempt to decrypt the message using at least one of the decryption algorithms and at least one quantum decryption keys that are generated using the first quantum particle state; and in response to failing to decrypt the message as a result of the quantum particle state changing from the first quantum particle state to a second particle state, determine the type of unauthorized access that occurred during communication of the message.

2. The system of claim 1, wherein the second processor of the second computing device is configured to determine the type of unauthorized access wherein the type of access is one of (i) observing the message (ii) reading data in the message (iii) writing data from the message, (iv) logging the message, and (v) storing the message.

3. The system of claim 1, wherein the second processor of the second computing device is configured to determine the type of unauthorized access based on the second particle state, wherein each type of unauthorized access corresponds to a different change in particle state.

4. The system of claim 1, further comprising a neural network database that stores empirical data associated with previous changes in quantum particle states resulting from attempts to access a message during communication.

5. The system of claim 1, wherein the second processor of the second computing device is configured to determine the type of unauthorized access based on analyzing the empirical data stored in the neural network database.

6. The system of claim 5, wherein analyzing the empirical data stored in the neural network database includes comparing the quantum particle state change undergone by the message to previous changes in quantum particle states to determine the type of unauthorized access.

7. The system of claim 5, wherein analyzing the empirical data stored in the neural network database further results in determination of at least one of (i) a party to the unauthorized access, and (ii) infrastructure used to perform the unauthorized access.

8. The system of claim 1, wherein the second processor of the second computing device is configured to determine the type of unauthorized access based on reading data logged in an unencrypted block within the message, wherein the data defines the type of access.

9. A method for determining a type of unauthorized access during communication of a quantum-level encrypted message, the method comprising:

encrypting, by a computing processor, a message using at least one of the encryption algorithms and at least one quantum encryption keys that are generated using a first quantum particle state;

initiating, by a computing processor, communication of the message to a predetermined message recipient;

in response to at least an attempt to access the message during communication of the message to the predetermined recipient, changing the quantum particle state from the first quantum particle state to a second quantum particle state;

receiving, by a computing processor, the message by the predetermined message recipient;

attempting, by a computing device processor, to decrypt the message using at least one decryption algorithm and at least one quantum decryption keys that are generated using the first quantum particle state; and in response to failing to decrypt the message, determining, by a computing device processor, the type of unauthorized access that occurred during communication of the message.

10. The method of claim 9, wherein determining the type of access further comprises determining the type of access, wherein the type of access is one of (i) observing the message, (ii) reading data in the message, (iii) writing data from the message, (iv) logging the message, and (v) storing the message.

11. The method of claim 9, wherein determining the type of access further comprises determining the type of access based on types of unauthorized access corresponding to a different changes in particle state.

12. The method of claim 9, wherein determining the type of access further comprises determining the type of access by accessing a neural network database to analyze empirical data associated with previous changes in quantum particle states resulting from attempts to access a message during communication.

13. The method of claim 12, wherein accessing the neural network further comprises accessing the neural network to analyze the empirical data by comparing the quantum particle state change to previous changes in quantum particle states to determine the type of unauthorized access.

14. The method of claim 12, wherein accessing the neural network further comprises accessing the neural network to analyze the empirical data to determine at least one of (i) a party to the unauthorized access, and (ii) infrastructure used to perform the unauthorized access.

15. The method of claim 9, determining the type of access further comprises determining the type of access based on reading data logged in an unencrypted block within the message, wherein the data defines the type of access.

16. A computer program product for determining a type of unauthorized access during communication of a quantum-level encrypted message, the computer program product comprising:

a non-transitory computer-readable medium comprising a set of codes for causing at least one computer to:

encrypt a message using at least one of the encryption algorithms and at least one quantum encryption keys that are generated using a first quantum particle state;

initiate electronic communication of the message to a predetermined message recipient;

wherein in response to at least an attempt to access the message during communication of the message to the predetermined recipient, changing the quantum particle state from the first quantum particle state to a second quantum particle state;

receive the message by the predetermined message recipient;

attempt to decrypt the message using at least one decryption algorithm and at least one quantum decryption keys that are generated using the first quantum particle state; and in response to failing to decrypt the message, determine the type of unauthorized access that occurred during communication of the message.

17. The computer program product of claim 16, wherein the set of codes for causing the at least computer to determine the type of access further comprises the set of codes for causing the at least one computer to determine the type of access, wherein the type of access is one of (i) observing the message, (ii) reading data in the message, (iii) writing data from the message, (iv) logging the message, and (v) storing the message.

18. The computer program product of claim 16, wherein the set of codes for causing the at least computer to determine the type of access further comprises the set of codes for causing the at least one computer to determine the type of access based on types of unauthorized access corresponding to a different changes in particle state.

19. The computer program product of claim 16, wherein the set of codes for causing the at least computer to determine the type of access further comprises the set of codes for causing the at least one computer to determine the type of access by accessing a neural network database to analyze empirical data associated with previous changes in quantum particle states resulting from attempts to access a message during communication.

20. The computer program product of claim 19, wherein the set of codes further comprises a set of codes for causing the at least one computer to access the neural network to analyze the empirical data to determine at least one of (i) a party to the unauthorized access, and (ii) infrastructure used to perform the unauthorized access.

* * * * *